(12) United States Patent
Cornwell

(10) Patent No.: US 8,400,281 B2
(45) Date of Patent: Mar. 19, 2013

(54) WIRELESS IDENTIFICATION SYSTEM USING A DIRECTED-ENERGY DEVICE AS A TAG READER

(75) Inventor: James Cornwell, Irvine, CA (US)

(73) Assignee: Kaonetics Technologies, Inc., Fort Worth, TX (US)

( * ) Notice: Subject to any disclaimer, the term of this patent is extended or adjusted under 35 U.S.C. 154(b) by 1072 days.

(21) Appl. No.: 12/271,682

(22) Filed: Nov. 14, 2008

(65) Prior Publication Data

US 2009/0121839 A1 May 14, 2009

Related U.S. Application Data

(60) Provisional application No. 60/987,828, filed on Nov. 14, 2007.

(51) Int. Cl.
*G08C 19/12* (2006.01)

(52) U.S. Cl. ............... 340/13.26; 340/10.1; 340/10.3; 324/307; 324/309; 455/39; 455/260; 313/309; 313/495

(58) Field of Classification Search ............. 340/10.1, 340/572.1, 13.26, 10.3; 398/115; 324/307, 324/309; 455/39, 260; 313/309, 495
See application file for complete search history.

(56) References Cited

U.S. PATENT DOCUMENTS

| | | | | |
|---|---|---|---|---|
| 3,597,683 A * | 8/1971 | Saito et al. | ........................ | 324/96 |
| 3,768,043 A * | 10/1973 | Foldes | ............................ | 333/135 |
| 4,063,229 A * | 12/1977 | Welsh et al. | .................... | 340/571 |
| 4,191,953 A * | 3/1980 | Woode | ............................ | 340/552 |
| 4,223,264 A * | 9/1980 | Yamamura et al. | .............. | 324/95 |
| 4,287,488 A * | 9/1981 | Brau et al. | ......................... | 372/2 |
| 4,420,756 A * | 12/1983 | Hamada et al. | ................ | 342/153 |
| 4,758,806 A * | 7/1988 | Mohring et al. | ............... | 333/135 |
| 4,847,848 A * | 7/1989 | Inoue et al. | ................. | 372/50.21 |
| 4,975,917 A | 12/1990 | Villa | | |
| 5,054,046 A | 10/1991 | Shoulders | | |
| 5,054,047 A | 10/1991 | Shoulders | | |

(Continued)

FOREIGN PATENT DOCUMENTS

| | | |
|---|---|---|
| CN | 215560 | 2/1994 |
| EP | 1372104 | 12/2003 |

(Continued)

OTHER PUBLICATIONS

International Search Report and Written Opinion dated May 19, 2009 from International Application No. PCT/US2008/012673 corresponding to U.S. Appl. No. 12/269,880.

(Continued)

*Primary Examiner* — Jennifer Mehmood
*Assistant Examiner* — Rufus Point
(74) *Attorney, Agent, or Firm* — Steven R. Vosen

(57) ABSTRACT

A wireless identification system can include a directed-energy device configured as a reader. The reader can include a charged particle generator configured to generate energized particles and a charge transformer configured to receive the energized particles that include charged particles from the charged particle generator and to output a wavefront including energized particles that include particles having substantially zero charge. The system can also include an identification tag configured to be activated when impinged by the wavefront from the reader so as to transmit a signal configured to be used by the reader. A method of using a directed-energy device as a tag reader in a wireless identification system can include generating a wavefront that includes particles at substantially zero charge, impinging an identification tag with the wavefront so as to activate the identification tag so as to send a signal and detecting a signal transmitted by the identification tag.

29 Claims, 3 Drawing Sheets

U.S. PATENT DOCUMENTS

| | | | |
|---|---|---|---|
| 5,249,191 A * | 9/1993 | Sawaki et al. | 372/22 |
| 5,365,927 A | 11/1994 | Roemer | |
| 5,373,215 A * | 12/1994 | Steinkraus, Jr. | 315/200 R |
| 5,594,296 A | 1/1997 | Mitsutake et al. | |
| 5,621,384 A * | 4/1997 | Crimmins et al. | 340/539.3 |
| 5,682,412 A | 10/1997 | Skillicorn et al. | |
| 5,912,469 A | 6/1999 | Okino | |
| 6,104,295 A * | 8/2000 | Gaisser et al. | 340/573.4 |
| 6,124,596 A | 9/2000 | Nakasuji | |
| 6,567,685 B2 | 5/2003 | Takamori | |
| 6,657,594 B2 | 12/2003 | Anderson | |
| 6,756,930 B1 | 6/2004 | Nunuparov et al. | |
| 6,784,408 B1 | 8/2004 | Cheung et al. | |
| 6,809,307 B2 * | 10/2004 | Byren et al. | 250/201.9 |
| 6,838,992 B2 * | 1/2005 | Tenarvitz | 340/573.1 |
| 6,849,841 B2 | 2/2005 | Byren et al. | |
| 6,864,825 B2 * | 3/2005 | Holly | 342/13 |
| 6,945,078 B2 * | 9/2005 | Fukuda et al. | 65/386 |
| 7,034,690 B2 * | 4/2006 | Chaco | 340/573.1 |
| 7,061,241 B2 | 6/2006 | Le Roux | |
| 7,098,662 B2 | 8/2006 | Hinks et al. | |
| 7,126,530 B2 | 10/2006 | Brown | |
| 7,221,329 B2 | 5/2007 | Cornwell | |
| 7,229,023 B2 * | 6/2007 | Raskar | 235/492 |
| 7,232,067 B1 * | 6/2007 | Bromer | 235/385 |
| 7,275,040 B2 * | 9/2007 | Forster et al. | 705/18 |
| 7,295,108 B2 * | 11/2007 | Corrado et al. | 340/539.22 |
| 7,374,106 B1 * | 5/2008 | Bromer | 235/492 |
| 7,425,899 B2 * | 9/2008 | Stewart et al. | 340/572.4 |
| 7,653,919 B2 * | 1/2010 | Potyrailo et al. | 720/718 |
| 7,701,381 B2 * | 4/2010 | Schmitt et al. | 342/42 |
| 7,741,971 B2 * | 6/2010 | Rodgers | 340/572.1 |
| 7,839,145 B2 * | 11/2010 | Cornwell | 324/307 |
| 7,869,338 B2 * | 1/2011 | Miyashita et al. | 369/273 |
| 7,997,495 B2 * | 8/2011 | Rodgers | 235/482 |
| 8,054,160 B2 * | 11/2011 | Corrado et al. | 340/10.1 |
| 8,200,151 B2 * | 6/2012 | Cornwell | 455/39 |
| 8,205,800 B2 * | 6/2012 | Addy | 235/492 |
| 8,248,214 B2 * | 8/2012 | Moseley | 340/13.25 |
| 2002/0167405 A1 * | 11/2002 | Shanks et al. | 340/572.1 |
| 2003/0137645 A1 * | 7/2003 | Fluckiger | 356/4.01 |
| 2004/0047578 A1 * | 3/2004 | Fukuda et al. | 385/129 |
| 2005/0212673 A1 * | 9/2005 | Forster | 340/572.7 |
| 2005/0223847 A1 * | 10/2005 | Shiraishi et al. | 75/348 |
| 2005/0229783 A1 * | 10/2005 | Alvarez et al. | 95/117 |
| 2006/0109123 A1 * | 5/2006 | Carrender | 340/572.1 |
| 2006/0127097 A1 * | 6/2006 | Obrea et al. | 398/115 |
| 2006/0145864 A1 * | 7/2006 | Jacober et al. | 340/572.8 |
| 2007/0259641 A1 | 11/2007 | Gorrell et al. | |
| 2007/0273244 A1 | 11/2007 | Lal et al. | |
| 2008/0090519 A1 * | 4/2008 | Rofougaran et al. | 455/41.1 |
| 2008/0150165 A1 * | 6/2008 | Stumbo et al. | 257/784 |
| 2008/0258261 A1 * | 10/2008 | Rodgers | 257/533 |
| 2009/0121839 A1 * | 5/2009 | Cornwell | 340/10.1 |
| 2009/0123163 A1 * | 5/2009 | Cornwell | 398/183 |
| 2010/0117819 A1 * | 5/2010 | Murray | 340/517 |
| 2010/0305554 A1 * | 12/2010 | Cornil et al. | 606/9 |

FOREIGN PATENT DOCUMENTS

| | | | |
|---|---|---|---|
| GB | 2429592 | | 2/2007 |
| GB | 2429592 A | * | 2/2007 |
| JP | 07-235257 | | 9/1995 |
| WO | 2006086658 A1 | | 8/2006 |

OTHER PUBLICATIONS

International Search Report and Written Opinion dated May 29, 2009 from International Application No. PCT/US2008/012843 corresponding to U.S. Appl. No. 12/272,394.

International Search Report and Written Opinion dated May 25, 2009 from International Application No. PCT/US2008/012678 corresponding to U.S. Appl. No. 12/269,876.

International Search Report and Written Opinion dated Jun. 11, 2009 from International Application No. PCT/US2008/012672 corresponding to U.S. Appl. No. 12/269,878.

Cornwell, Copending U.S. Appl. No. 12/269,876, filed Nov. 12, 2008 entitled "Directed-Energy System and Methods for Disrupting Electronic Circuits".

Cornwell, Copending U.S. Appl. No. 12/269,878, filed Nov. 12, 2008 entitled "Method and Apparatus for Enhancing Signal Carrier Performance in Wireless Networks".

Cornwell, Copending U.S. Appl. No. 12/269,880, filed Nov. 12, 2008 entitled "Method of Producing a Highly Permeable Stable RF Wavefront Suitable as a Data Carrier".

Cornwell, Copending U.S. Appl. No. 12/272,394, filed Nov. 17, 2008 entitled "Directed-Energy Imaging System".

Notification of Transmittal of the International Search Report and the Written Opinion of the International Searching Authority (Forms PCT/ISA/220, PCT/ISA/210 and PCT/ISA/237) in the corresponding International Application No. PCT/US2008/012831 dated Feb. 19, 2009.

Extended Search Report issued on Mar. 11, 2011 in European Patent Appln. No. 08850425.3.

* cited by examiner

WIRELESS IDENTIFICATION SYSTEM USING A DIRECTED-ENERGY DEVICE AS A TAG READER

CROSS-REFERENCE TO RELATED APPLICATIONS

This application claims priority from U.S. Provisional Patent Application Ser. No. 60/987,828, filed Nov. 14, 2007, the disclosure of which is hereby incorporated by reference in its entirety. This application also incorporates by reference in their entirety U.S. Provisional Patent Application Ser. Nos. 61/113,847, filed Nov. 12, 2008, and 60/987,691, filed Nov. 13, 2007.

PCT International Pub. No. WO2006/086658 titled "Antenna System," which is a continuation of International Application Number PCT/US2006/004779, filed Feb. 13, 2006, is incorporated by reference herein in its entirety. U.S. Pat. No. 7,221,329 titled "Enhanced Beam Antenna," dated May 22, 2007, is also incorporated by reference herein in its entirety.

BACKGROUND

1. Field

The subject matter presented herein relates generally to wireless identification systems that use electronically sensitive tags to store and provide identification information, and more particularly, to an identification system that employs a directed-energy device as a tag reader.

2. Description of Related Art

Radio Frequency Identification (RFID) systems can be used in a variety of industries to identify, track and provide various other types of information related to the items upon which the tag is placed. A typical RFID system can include at least one transmitting and receiving device, commonly called a reader, and at least one passive or active target device, commonly called a tag or transponder. A basic principal of operation of an RFID system involves the transmission of radio frequency (RF) energy from the reader to the tag. The tag can receive the signal, modify the energy, and reflect the modified signal back to the reader where the reflected and modified return signal can be received, read and decoded. The reader can contain antennae for receiving information from the tag.

RFID tags can contain at least two parts. One can be an integrated circuit for storing and processing information, modulating and demodulating an RF signal, and other specialized functions. The second part can be an antenna for receiving and transmitting the signal.

When an RFID tag passes through a field of a scanning antenna associated with a reader, it can detect an activation signal from the antenna. An activation signal can "wake up" or excite the RFID tag, allowing the RFID tag to transmit information on its microchip and to be received by the scanning antenna of the reader.

In some instances, the tags can have their own internal power source (active tag). Passive RFID tags have no internal power supply. The minute electrical current induced in an antenna in the tag by the incoming RF signal can provide enough power for a, e.g., CMOS integrated circuit in the tag to power up and transmit a response. Passive tags can signal by backscattering the carrier wave from the reader. This means that an antenna structure in the RFID can be designed both to collect power from the incoming signal and to transmit the outbound backscatter signal. The response of a passive RFID tag may not necessarily be just an ID number; the tag chip can contain non-volatile data, possibly even a writable EEPROM for storing data.

The transmission of information and power between the reader and the tag can typically be accomplished by the modulation of the RF carrier. In these instances, a reader can be maintained in the ON state to provide power to passive tags and/or can be pulsed off and on for short intervals to receive the information from active and passive tags.

Common issues with RFID systems can include reader collision and tag collision. Reader collision can occur when the signals from two or more readers overlap. The tag may be unable to respond to simultaneous queries. Systems can be carefully set up to avoid this problem. Tag collision can occur when many tags are present in a small area.

Another issue with RFID devices is range. RFID devices can typically work within a few feet (up to 20 feet for high-frequency devices, for example) of a scanner/reader. Various factors can affect the distance at which an identification tag can be read (the read range). The frequency used for identification, the antenna gain, the orientation and polarization of the reader antenna and the transponder antenna, as well as the placement of the tag on the object to be identified can have an impact on the RFID tag system's read range.

On a different note, the configuration and operation of directed energy devices varies widely as is illustrated by the disclosures within U.S. Pat. Nos. 6,809,307; 6,784,408; 6,849,841; 6,864,825 and 7,126,530, which are incorporated herein by reference in their entirety.

SUMMARY

In an exemplary embodiment, a wireless identification system can include a directed-energy device configured as a reader, comprising a charged particle generator configured to generate plural energized particles; and a charge transformer configured to receive the plural energized particles that include charged particles from the charged particle generator and to output a wavefront including energized particles that include particles having substantially zero charge; and an identification tag configured to be activated when impinged by the wavefront from the reader so as to transmit a signal configured to be used by the reader.

In an exemplary embodiment, a method of using a directed-energy device as a tag reader in a wireless identification system can include generating a wavefront that includes particles at substantially zero charge; impinging an identification tag with the wavefront so as to activate the identification tag so as to send a signal; and detecting a signal transmitted by the identification tag.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

Figure 1:
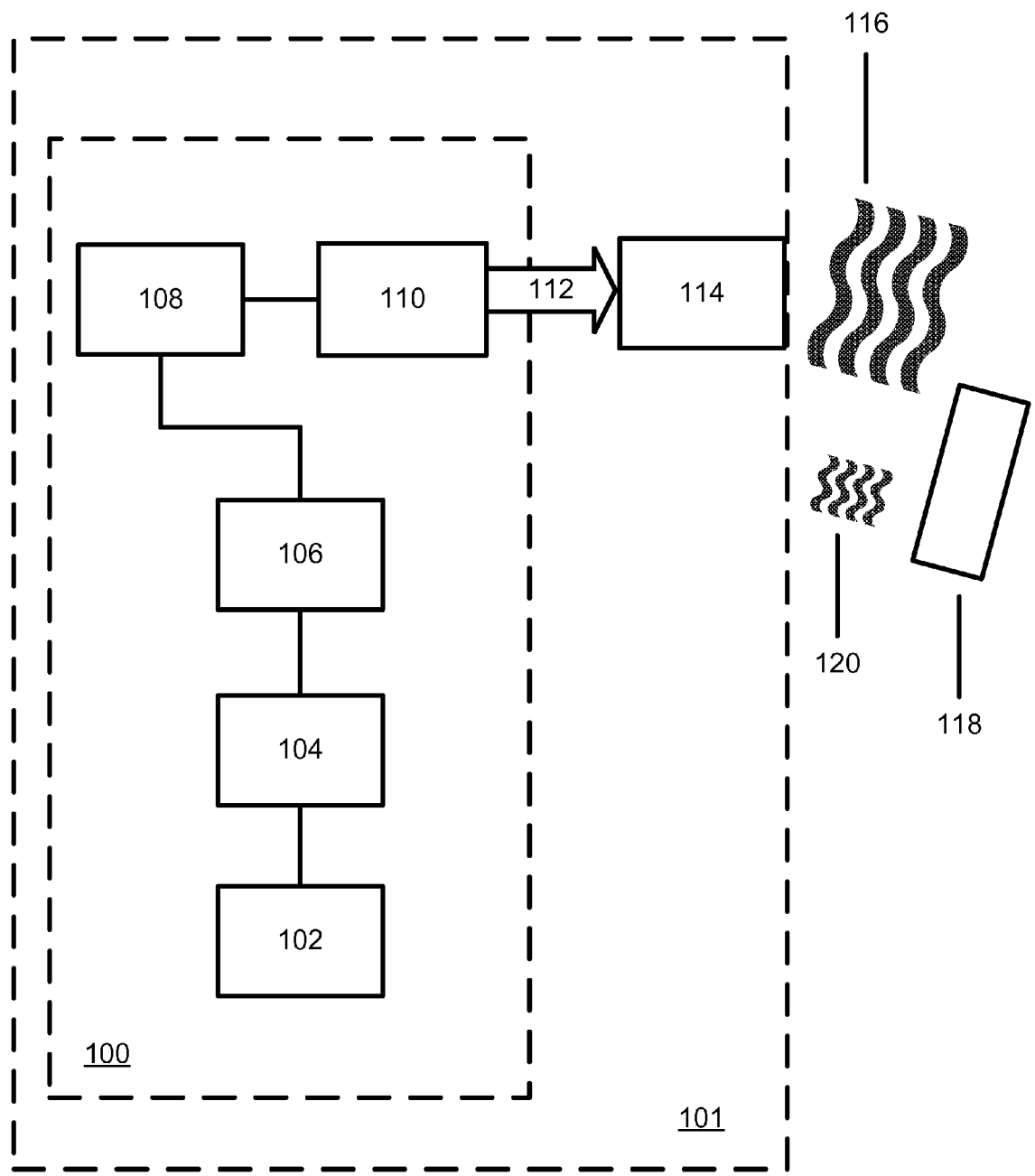
FIG. 1 shows a functional block diagram of an exemplary embodiment of a wireless identification tag system.
Figure 2:
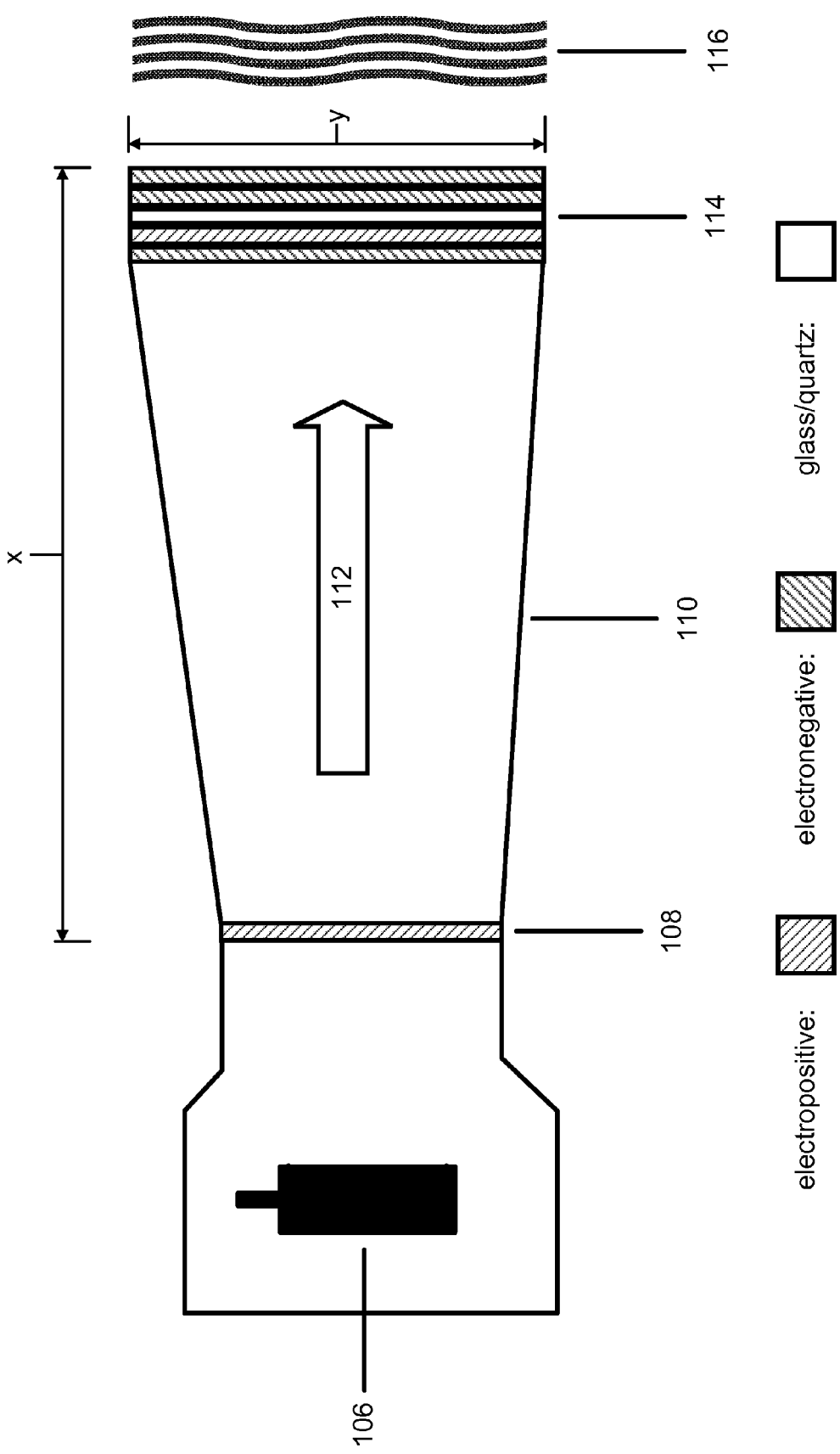
FIG. 2 shows a simplified cross-sectional view of portions of an exemplary embodiment of a wireless identification tag system.

Referring to FIGS. 1 and 2, an exemplary embodiment of a wireless identification system using a directed-energy device as a tag reader can include a directed energy device 101, which can further include a charged particle generator 100 configured to generate plural energized particles and a charge transformer 114 configured to receive the plural energized particles that include charged particles from the charged particle generator and to output a wavefront 116 including energized particles that include particles having substantially zero charge. The charged particle generator 100 can be configured to direct the plural energized particles through the charge transformer 114 to propagate through free space until impinging on wireless identification tag 118. The presence of wavefront 116 at wireless identification tag 118 can activate wireless identification tag 118 so as to transmit a signal 120, which can be configured to be used by a reader, for example, after being received by a waveguide 110 in the charged particle generator 100, which can essentially operate in reverse when receiving the tag signal 120. However, the tag 118 can generate, in response to the substantially zero charge wavefront 116, a signal of a different nature, e.g., an electromagnetic signal, such as an RF signal, microwave signal or visible wavelength signal to name a few. In an embodiment, an exemplary wireless identification system as disclosed herein may not suffer from multipath issues that can result in interference and transmission problems due to the nature of the zero-charge wavefront 116. For example, known RFID systems can have difficulty operating in and around, for example, metal structures and objects, due to reflectivity and grounding out of an electromagnetic wavefront, for example.

In an exemplary embodiment, the plural energized particles 112 can be in the form of a photon particle wave, e.g., a mixture or cross-generation of photons and electrons.

Power and control components will be known to those of skill in the art. For example, in an exemplary embodiment, energized particle generator 100 can include a DC power supply 102 and DC-to-AC converter 104.

In an exemplary embodiment, charged particle generator 100 can include charged particle emitter 106. In an embodiment, charged particle emitter 106 can include any source of radio frequency energy, including microwaves. In some embodiments, charged particle emitter 106 may include known magnetrons. In some other embodiments, charged particle emitter 106 may include solid-state power amplifiers, gyrotrons, traveling wave tubes (TWTs), and/or klystrons. In some embodiments, charged particle emitter 106 may be a lower-power source and may generate energy levels of approximately 1 kilowatt (kW) to approximately 100 kW or greater, although the scope is not limited in this respect.

In an exemplary embodiment, in charged particle emitter 106, an RF signal can be formed using known techniques. The RF signal can be combined with an excitation signal, which can form a modulated photon wave. In an embodiment, the RF signal can be transmitted to a plurality of directional antenna devices, for example, which may be included in waveguide 110. By the amplification of the RF signal to a very high signal voltage and subsequent application of this amplified RF signal to the directional antenna devices, an ionic discharge at the antennas can occur that can transform the RF signal into a directed particle beam including plural energized particles.

In an embodiment, waveguide 110 can be configured to minimize backscatter of the energized particles using known techniques. For example, using a plurality of backscatter reflectors, which can be included in waveguide 110 in proximity to the directional antennas, the particle beam can then be further focused and directed via waveguide 110 as an electromagnetic wavefront 112 to impinge on the surface of charge transformer 114.

Without limiting the scope of the invention, other examples of suitable charged particle emitters that can form a photon particle wave include known energy emission devices such as free electron lasers and discharges or arcs at edges of planar antennae, for example, spark gap generators.

In some embodiments, charged particle emitter 106 may include a free electron laser, or FEL. A FEL is a laser that shares the same optical properties as conventional lasers such as emitting a beam consisting of coherent electromagnetic radiation which can reach high power, but which uses some very different operating principles to form the beam. Unlike gas, liquid, or solid-state lasers such as diode lasers, which rely on bound atomic or molecular states, FELs use a relativistic electron beam as the lasing medium, hence the term free electron. This gives them a wide frequency range compared to other laser types, and makes many of them widely tunable, currently ranging in wavelength from microwaves, through terahertz radiation and infrared, to the visible spectrum, to ultraviolet, to soft X-rays.

In an exemplary embodiment, charged particle emitter 106 can include an excitation signal, produced by known signal generation devices, for example. Such an excitation signal could be a 120 VAC clipped (square) wave that can have an effect of driving a magnetron outside of a typical 2.45 GHz frequency, for example. In an embodiment, when a 120 VAC square wave excitation signal is applied to a magnetron, bandwidths on the order of 0 to 10 GHz can be achieved.

In an exemplary embodiment, the output of charged particle emitter 106 can be a photon particle wave that can include a mixture of photons and electrons.

In an exemplary embodiment, charged particle generator 100 can include an energized particle, e.g., photon and/or particle beam or wave, forming module 108. In an exemplary embodiment, energized particle (photon particle beam or wave) forming module 108 can be positioned in a throat section of a waveguide launcher between charged particle emitter 106 and waveguide 110.

In an exemplary embodiment, energized particle forming module 108 can be made of an electropositive material, such as a polycarbonate sheet. In an embodiment, this material can include DELRIN manufactured by DuPont. In an embodiment, energized particle forming module 108 can act like a roughing filter, i.e., it can start the process of reducing the charge of the charged particles in the mixture of photons and electrons. After passing through energized particle forming module 108, the mixture of photons and electrons can then be directed via waveguide 110 as an electromagnetic wavefront 112 to impinge on the surface of charge transformer 114.

In an exemplary embodiment, waveguide 110 can include a hollow conducting tube, which may be rectangular or circular, for example, within which EM waves can be propagated. Signals can propagate within the confines of metallic walls, for example, that act as boundaries.

In an exemplary embodiment, waveguide 110 can be configured as a circularly polarized antenna and may radiate substantially circularly polarized energy. In other embodiments, waveguide 110 may be linearly polarized and may radiate signals with a linear polarization (e.g., a horizontal and/or a vertical polarization). Antennas in many shapes, such as horns, lenses, planar arrays, and reflectors may be suitable in some of these embodiments.

As shown in FIG. 2, exemplary waveguide 110 can be configured as part of a device that can include a magnetron portion, a throat section of a waveguide launcher area that can include energized particle forming module 108 positioned between charged particle emitter 106 and waveguide 110, and a cone-like portion or horn. In an exemplary embodiment, a magnetron can be placed in the magnetron portion such that there can be a three-inch gap between the top of the magnetron's cathode and the top of the enclosure.

In an exemplary and non-limiting embodiment, waveguide 110 can be designed to promote sufficient velocity of the photon particle wave that can include a mixture of photons and electrons particles, here designated as EM wavefront 112, moving through the waveguide 110. Again referring to FIG. 2, x refers to a length of exemplary waveguide 110 (which can include energized particle forming module 108) and y refers to a height of an aperture opening at the end of waveguide 110. In an exemplary embodiment, the ratio of x/y can be approximately 3 to 3.5 to 1 to promote sufficient velocity of the particles moving through the waveguide 110. For example, assuming that the aperture opening height (y) is six inches, then waveguide 110 length can be from 18 to 21 inches. In another embodiment, a length of waveguide 110 can be based on the ratio of six times the air gap above an exemplary magnetron's cathode. Using the previously mentioned three-inch gap, this results in a waveguide length of eighteen inches.

In an exemplary embodiment, the aperture opening can be generally rectangular. In an embodiment, the aperture opening width can be eight inches for an aperture opening height (y) of six inches. In an exemplary embodiment, the length of the launcher area before the waveguide 110 can be approximately two inches.

In an exemplary embodiment, the interior surface of exemplary waveguide 110 can be coated with approximately two mils (0.002 inches) of a noble metal, such as 14-carat gold, for example. Other noble metals can include ruthenium, rhodium, palladium, osmium, iridium and platinum. Such a coating can improve the gain characteristics of waveguide 110. An example of a suitable coating process that can be used to enhance the performance of antennas or waveguides may be found in U.S. Pat. No. 7,221,329, the disclosure of which is hereby incorporated by reference in its entirety.

In an exemplary embodiment, EM wavefront 112 can be directed through charge transformer 114. In an embodiment, charge transformer 112 can have dielectric and physical characteristics such that the energized charged particles, e.g., electrons, in an EM wavefront 112 can be transformed. While not wishing to be bound by any particular theory, this may be done either by changing characteristics of the particle, or by generation or emission of different particles as a result thereof, thereby creating a wavefront 116 at the output of the charge transformer 114. Wavefront 116 can have the modulation properties of the original RF data signal and propagate through free space until impinging on wireless identification tag 118.

In an exemplary embodiment, a 600 W magnetron can produce a wavefront 116 of about 10 mW/cm2 at the aperture, which can result in about 2 mW/cm2 at 1 meter from the aperture.

In an exemplary embodiment, charge transformer 114 can include an incident surface for receiving the EM wavefront 112 and an exit surface for radiating the wavefront 116.

In an exemplary embodiment, charge transformer 114 can include a composite of glass and/or polycarbonate materials, for example, and can vary in shape. For example, flat plates or panes with parallel surfaces can be used as well as convex lenses of a desired focal length. Hybrid configurations with parallel surfaces at the center and convex surfaces at the edges can also be acceptable configurations.

Referring to FIG. 2, in an exemplary embodiment, charge transformer 114 can include at least one electronegative/electropositive material pair, i.e., an electronegative layer next to an electropositive layer, or vice versa, that first receives EM wavefront 112, followed by approximately ½ inch of glass or quartz, followed by two electronegative layers. In an exemplary embodiment, this assembly of layers can be vacuum-sealed in ABS plastic.

Suitable materials for the electronegative/electropositive material pair can include known materials that can exhibit electronegative/electropositive behavior. As previously mentioned, an electropositive material can include a polycarbonate sheet made of DELRIN, for example. Suitable polycarbonate can also be chosen for electronegative layers. In another embodiment, plate glass can be sputtered with metal oxides to achieve desired electronegative/electropositive behavior.

In an exemplary embodiment, the approximately ½ inch of glass layer can include leaded glass if additional dampening of the emitted zero-charge particle stream is desired.

In an exemplary embodiment, there can be plural pairs of electronegative/electropositive material that first receives EM wavefront 112 followed by a glass or quartz layer.

In an exemplary embodiment, horizontal and/or vertical slits or other openings can be formed into or cut out of charge transformer 114 so that in addition to wavefront 116 propagating from charge transformer 114, charged particles in EM wavefront 112 can also propagate from the device. A controlled amount of charged particles along with wavefront 116 may be useful depending on the operating environment. In an exemplary embodiment, the slits or other openings may be adjustable by an operator using known methods and/or materials. For example, tape, a slide mechanism, or an aperture mechanism could be used to adjust the slits.

Charge transformer 114 may incorporate known coating materials or multiple deposition layers on either the incident surface or the exit surface to aid in the wavefront 116 generation, and/or have abrasion or polishing performed on either surface to enhance desired characteristics of the charge transformer 114. Similarly, side surfaces may have similar operations performed to enhance the desired charge transformer 114 characteristics. Other compositions materials and combinations of materials may be used in the fabrication of the charge transformer 114 to achieve desired transformation effects. Additionally, other geometries may be used for charge transformer 114, including, without limitation, stacking additional charge transformer components in combinations that may reflect, refract or redirect EM wavefront 112.

In an exemplary embodiment, wavefront 116, after exiting charge transformer 114, is shown in FIG. 1 propagating through free space until impinging on wireless identification tag 118. The presence of wavefront 116 at wireless identification tag 118 can activate wireless identification tag 118 so as to send signal 120, which can be detected by waveguide 110.

In an exemplary embodiment, the wireless identification tag 118 can be based on known RFID tag technology. For example, wireless identification tag 118 can be adapted to respond to the wavefront 116 from the directed-energy platform, which may be outside of typical RFID system range. For example, a minute electrical current can be induced in the wireless identification tag 118 by the incoming wavefront 116 of zero-charge particles. In an embodiment, this interacton can provide enough power for the CMOS integrated circuit in the tag, for example, to power up and transmit a response that can be received by waveguide 110, for example.

In an exemplary embodiment, the wireless identification system can be configured to operate over a frequency range from about 804 MHz to 940 MHz. In an exemplary embodiment, a sighting device, such as a laser, rifle scope or gun sight, can be incorporated into an exemplary directed-energy device 101 and used to help direct the wavefront 116.

Transforming the plural energized particles within the charge transformer can include laterally aligning the plural energized particles to produce a polarization of the plural energized particles. The plural energized particles can be generated by cross-generation of photons and electrons.

Various system components described above may be resized depending on the system parameters desired. For example, charge transformer 114 and waveguide 110 can be made larger or smaller and can have different dimensions and geometries depending, for example, on the power or distance requirements of a particular application. Additionally, an exemplary charged particle emitter 106 may be configured by those skilled in the art to have multiple voltages, frequencies, and power levels.

The precise theory of operation of the charged particle generator 100 in combination with the charge transformer 114 is not entirely understood. Without wishing to be bound by any theory, it is believed that the charge transformer 114 reduces the charge in the EM wavefront 112. Based on empirical data to date, it has been determined through experimentation, using, for example, exemplary embodiments described herein, that the particles in wavefront 116 are at a zero-charge state and approximately the same mass as an electron ($9.10938188 \times 10^{-31}$ kilograms).

While reiterating that the precise theory of operation is not entirely understood, it is believed that the effect is such that when a wavefront of exemplary zero-charge particles with sufficient energy density impinges a circuit, for example, the kinetic energy of the particles, rather than an associated electromagnetic charge, causes a resonant frequency. This resonant frequency may cause mechanical or physical oscillations.

In an exemplary embodiment, directional planar antennas, as described in the referenced PCT International Pub. No. WO2006/086658 titled "Antenna System," can be used to create and focus a directed particle beam, thereby enhancing signal carrier performance. A brief description of an example of one such antenna will be described to aid in the understanding of the embodiments disclosed herein.

Typically, an antenna can include a first insulating substrate extending in the principal plane of the antenna. The antenna can further include a first radiating element and a connected first conductor and can include a second radiating element and a connected second conductor. The antenna can further include a coupling conductor coupling the second radiating element and the first conductor. The first antenna can further include a first coupler having a first signal conductor and a second signal conductor. The first signal conductor can be coupled to the second conductor, and the second signal conductor can be coupled to the first radiating element.

In an exemplary embodiment, when RF signal currents are applied between the first and second signal conductors, radiating elements can resonate and operate as an antenna. The radiation that emanates from a radiating element can tend to emanate from the edge of the element, e.g., the edge of an etched copper, generally flat, shape. By incorporating a plurality of such antennas, each having a different principal plane or orientation, and where each may have a custom configuration, a composite radiation field pattern can be shaped and made highly directional. Each antenna configuration may be varied by size and shape to meet frequency requirements and impedance matching requirements according to known "patch radiator" technology. Such directional radiation effects can be incorporated in the embodiments disclosed herein.

Figure 3:
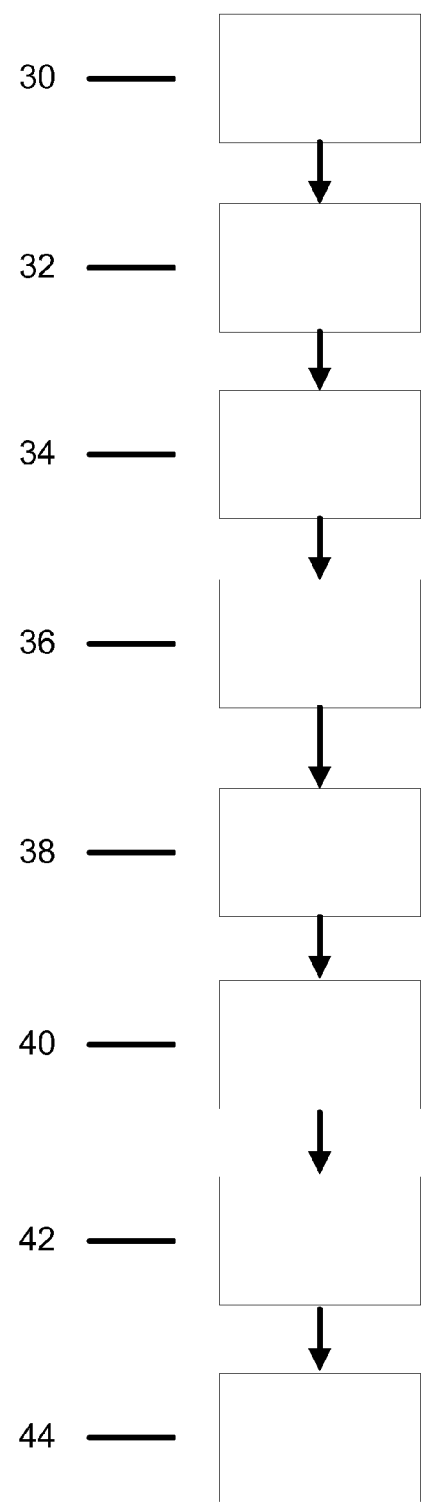
FIG. 3 shows a flow chart for an exemplary method using an exemplary embodiment of a wireless identification tag system.

Referring to FIG. 3, an exemplary method of using a directed-energy device as a tag reader in a wireless identification system can include generating an RF signal in step 30; combining the RF signal with an excitation signal to produce a modulated signal in step 32; generating a modulated photon wave associated with the modulated signal in step 34, the modulated photon wave including plural energized particles; directing the modulated photon wave to an incident surface of an charge transformer in step 36; transforming the plural energized particles within the charge transformer, wherein the transformed particles are at substantially zero charge in step 38; generating a wavefront at an exit surface of the charge transformer that includes the transformed particles at substantially zero charge in step 40; impinging an identification tag with the wavefront so as to activate the identification tag so as to send a signal, in step 42; and detecting a signal transmitted by the identification tag, in step 44.

In an exemplary embodiment, the combining step 32 may take the form of superimposing the RF signal upon a signal composed of a square wave riding on a DC voltage level. The modulated photon wave generating step 34 may use, without limiting the scope of the invention, a magnetron as is known in the art or other energy emission device, such as discharges or arcs at edges of planar antennae.

In an exemplary embodiment, transforming the modulated photon wave within the charge transformer can include laterally aligning the photons in the modulated photon wave to produce a polarization of that modulated photon wave. This can be accomplished, for example, by manipulating electron speed of the photons, i.e. slowing the electron speeds to release energy in the form of the broadband wavefront. By controlling the design parameters of the charge transformer, desired communication characteristics may be enhanced.

In an exemplary embodiment, a feature of directed energy device 101 can be that the spectral range of the transmissions using the disclosed embodiments can be higher, and thus more removed from known RF communications system frequency bands. In addition to being in a currently unregulated spectral region, such a system can be less affected by interference from such known systems operating in the same space. Conversely, in an exemplary embodiment, this can additionally render the disclosed embodiments nearly undetectable by conventional RF receiver equipment.

The broadband wavefront 116 can behave in a manner that can be described by particle quantum physics rather than by typical communications theory, and can be characterized as being relatively immune to traditional RF interference. By controlling the configuration and material characteristics of charge transformer 114, the wavefront 116 of the transformed EM radiation 112 can be modified and enhanced based on desired operational characteristics.

The embodiments disclosed herein can provide an identification system that can operate outside of the radio frequency spectrum to provide a solution to tag collision and reader collision and can also provide an enhancement in range.

Exemplary embodiments disclosed herein can also include a method for detecting a wireless identification tag. The method can include generating a continuous electromagnetic wavefront, preferably by generating a photon particle wave and directing this photon particle wave through a charge transformer. Within the charge transformer, the photon particle wave can be transformed by manipulating the speed of the photons in the wave such that the photons become laterally aligned or polarized. When the photon particle wave impinges the opposing exit surface of the charge transformer, a continuous electromagnetic wavefront (EMW) can be generated. The continuous electromagnetic wavefront can be used to activate a wireless identification tag that can be tuned to respond to the continuous electromagnetic wavefront. The activated wireless identification tag can send a signal that can be detected by one or more antennas within the system, preferably those within the high frequency generator.

In an exemplary embodiment, by controlling the configuration and material characteristics of the charge transformer, the continuous electromagnetic wavefront can be used to expand the range of the system over that of known RFID systems.

The above description is presented to enable a person skilled in the art to make and use the systems and methods described herein, and is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A wireless identification system, comprising:
    a directed-energy device configured as a reader, comprising:
        a charged particle generator configured to generate plural energized particles; and
        a charge transformer configured to receive the plural energized particles that include charged particles from the charged particle generator and to output a wavefront including energized particles that include particles having substantially zero charge;
    and
    an identification tag configured to be activated when impinged by the wavefront from the reader so as to transmit a signal configured to be used by the reader.

2. The wireless identification system of claim 1, wherein the charged particle generator comprises:
    a charged particle emitter.

3. The wireless identification system of claim 2, wherein the charged particle emitter comprises:
    at least one of a magnetron, solid-state power amplifier, gyrotron, traveling wave tube, klystron and free electron laser.

4. The wireless identification system of claim 3, comprising:
    an excitation signal generator configured to generate an excitation signal to control the output of the charged particle generator.

5. The wireless identification system of claim 4, wherein the excitation signal comprises a 120 VAC square wave.

6. The wireless identification system of claim 1, wherein the plural energized particles comprise:
    a photon particle wave.

7. The wireless identification system of claim 6, wherein the photon particle wave comprises:
    a mixture of photons and electrons.

8. The wireless identification system of claim 1, wherein the charged particle generator comprises:
    an energized particle forming module.

9. The wireless identification system of claim 8, wherein the energized particle forming module comprises:
    an electropositive material.

10. The wireless identification system of claim 9, wherein the electopositive material comprises:
    polycarbonate.

11. The wireless identification system of claim 1, wherein the charged particle generator comprises:
    a waveguide.

12. The wireless identification system of claim 11, wherein a ratio of a length of the waveguide to a height of an aperture opening at an end of the waveguide is about 3 to 3.5 to 1.

13. The wireless identification system of claim 11, wherein an interior surface of the waveguide comprises:
    a coating of a noble metal.

14. The wireless identification system of claim 13, wherein the coating comprises:
    gold.

15. The wireless identification system of claim 13, wherein the coating is about two mils thick.

16. The wireless identification system of claim 1, wherein the charge transformer comprises:
    at least one pair of electronegative and electropositive material.

17. The wireless identification system of claim 16, wherein the electronegative and electropositive material comprises:
    polycarbonate.

18. The wireless identification system of claim 16, wherein the charge transformer comprises:
    a layer comprising at least one of glass and quartz adjacent to the at least one pair of electronegative and electropositive material.

19. The wireless identification system of claim 18, wherein the charge transformer comprises:
    one or more layers of electronegative material adjacent to the layer comprising at least one of glass and quartz.

20. The wireless identification system of claim 1, wherein the charge transformer comprises:
    one or more openings therethrough.

21. The wireless identification system of claim 20, wherein the one or more openings comprise:
    at least one of a horizontal slit and a vertical slit.

22. The wireless identification system of claim 11, wherein the waveguide comprises:
    one or more antennas configured to minimize backscatter.

23. The wireless identification system of claim 11, wherein the waveguide comprises:
    one or more antennas configured to be circularly polarized and radiate substantially circularly polarized energy.

24. The wireless identification system of claim 11, wherein the waveguide comprises:
    a horn antenna.

25. The wireless identification system of claim 1, wherein the charged particle generator is configured to generate plural energized particles and a photon particle wave at power levels of approximately 1 kilowatt (kW) to approximately 100 kW.

26. The wireless identification system of claim 1, wherein the wireless identification system is configured to operate over a frequency range from about 804 MHz to 940 MHz.

27. A method of using a directed-energy device as a tag reader in a wireless identification system, comprising:
    generating a wavefront that includes particles at substantially zero charge;
    impinging an identification tag with the wavefront so as to activate the identification tag so as to send a signal; and
    detecting a signal transmitted by the identification tag;

wherein generating the wavefront that includes particles at substantially zero charge comprises:
generating an RF signal;
combining the RF signal with an excitation signal to produce a modulated signal;
generating a modulated photon wave associated with the modulated signal, the modulated photon wave including plural energized particles;
directing the modulated photon wave to an incident surface of a charge transformer;
transforming the plural energized particles within the charge transformer, wherein the transformed particles are at substantially zero charge; and
generating a wavefront at an exit surface of the charge transformer that includes the transformed particles at substantially zero charge.

28. The method of claim 27, wherein transforming the plural energized particles within the charge transformer comprises: laterally aligning the plural energized particles to produce a polarization of the plural energized particles.

29. The method of claim 27, wherein the wireless identification system is configured to operate over a frequency range from about 804 MHz to 940 MHz.

* * * * *